United States Patent [15] 3,663,944

Low et al. [45] May 16, 1972

[54] INVERTER OSCILLATOR WITH VOLTAGE FEEDBACK

[72] Inventors: George M. Low, Acting Administrator of the National Aeronautics and Space Administration with respect to an invention of; Kurt Willner, 6317 Maryland Drive, Los Angeles, Calif. 90048; William T. McLyman, 2129 Lark Bay Lane, Lakewood, Calif. 90712

[22] Filed: Mar. 29, 1971

[21] Appl. No.: 129,071

[52] U.S. Cl. ..............................321/45 R, 321/2, 331/113 A

[51] Int. Cl. ..........................................................H02m 3/28

[58] Field of Search........................321/2, 18, 45; 331/113 A

[56] References Cited

UNITED STATES PATENTS 3,308,397 3/1967 Morgan..............................331/113 A
3,405,342 10/1968 Wilkinson.................................321/2
2,968,738 1/1961 Pintell...............................331/113 A
3,172,060 3/1965 Jensen ...............................331/113 A
3,350,661 10/1967 Bloom et al........................331/113 A
3,448,370 6/1969 Harrigan ..............................321/45 R
3,509,493 4/1970 Giudici ..............................331/113 A

*Primary Examiner*—William M. Shoop, Jr.
*Attorney*—John R. Manning, J. H. Warden and Paul F. McCaul

[57] ABSTRACT

An oscillator is disclosed for use in an inverter for a wide range of load using two transistors connected in a push-pull amplifier configuration having current feedback through primary windings of a saturable transformer connected in series with an output transformer between collectors of the transistors. Voltage feedback is provided through a third primary winding of the saturable transformer connected in series with a resistor between the collector of one transistor and a center tap in the primary winding of the output transformer.

8 Claims, 1 Drawing Figure

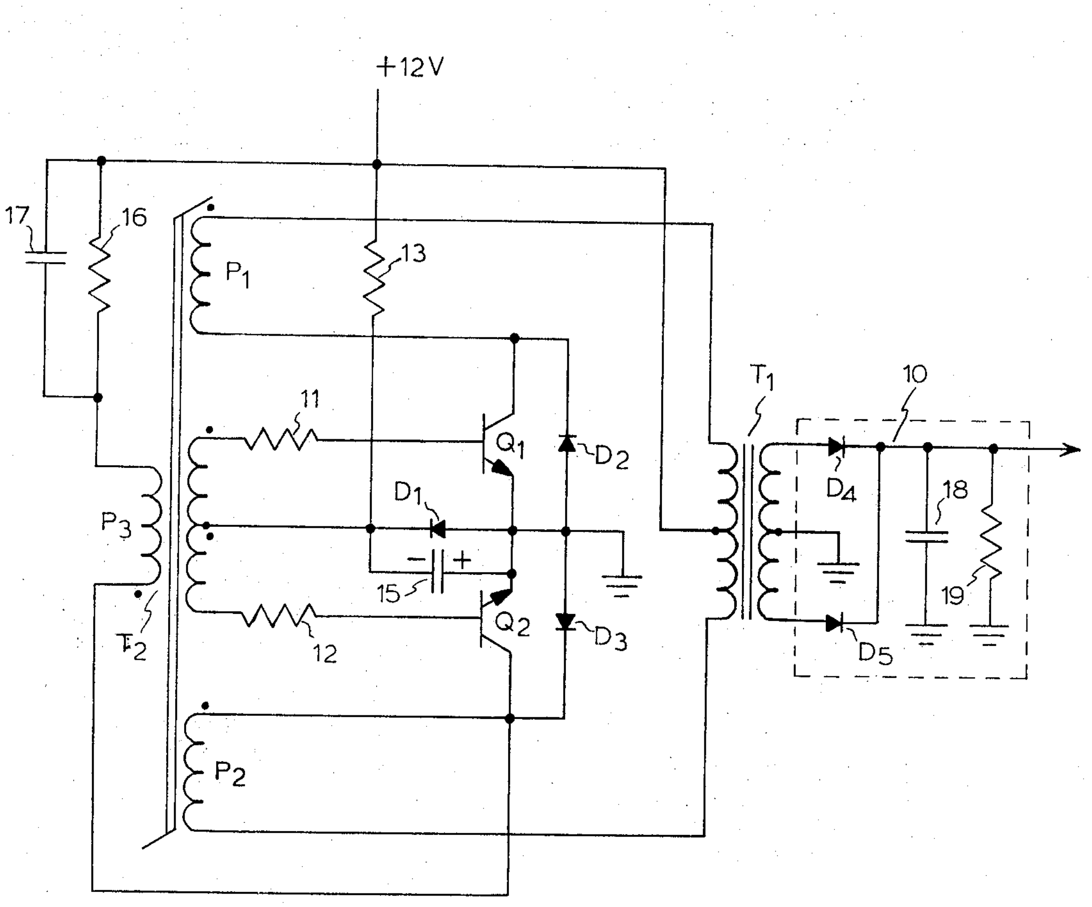
*INVENTORS*
KURT WILLNER
COLONEL WILLIAM T. McLYMAN
BY Paul F. McCaul
Monte F. Mott
ATTORNEYS

INVERTER OSCILLATOR WITH VOLTAGE FEEDBACK

ORIGIN OF THE INVENTION

The invention described herein was made in the performance of work under a NASA contract and is subject to the provisions of section 305 of the National Aeronautics and Space Act of 1958, Public Law 85-568 (72 Stat. 435; 42 USC 2457).

BACKGROUND OF THE INVENTION

This invention relates to an inverter oscillator, and more particularly to a square-wave transistor oscillator for an inverter.

In the past, inverters have been devised using square-wave transistor oscillators of the type described by James Lee Jensen in an article titled, "An Improved Square-Wave Oscillator Circuit," IRE Transactions on Circuit Theory, Ct4:3 pages 276–279 (September 1957). The circuit comprises two transistors in a push-pull amplifier configuration with positive feedback through a saturable transformer to turn on one transistor, and turn the other off. Once the induced feedback pulse produced in the feedback circuit by the transistor being turned on subsides, the conducting transistor is turned off, and stored inductive energy in the feedback circuit turns the second transistor on. The collector current of the second transistor will quickly increase to a level proportional to the load until the core of the transformer saturates. Collector current then rises to a level determined by the positive feedback circuit. Once that limit is reached, the induced feedback pulse subsides to complete another half of the oscillator.

Oscillators of these current-feedback type are frequently used in inverters because they are very efficient. The collector current pulses can be readily transformed to the desired voltage level and rectified, thus supplying high voltage DC from a source of low voltage DC. The frequency of the oscillator is almost independent of supply voltage and load, but not quite, particularly when a voltage feedback circuit is included since stray capacitance of the feedback winding must be alternately charged during each half cycle. That stray capacitance remains constant, but the current available to charge it at the beginning of each half cycle will vary with the load which may vary in some applications from full load to light or inductive load.

A voltage feedback is generally provided by an additional primary winding on the saturable transformer. That additional primary winding is driven by a separate secondary winding on an output transformer, or is driven directly by the collectors of the transistors. The direct voltage feedback connection to the collectors of the transistors is preferred because of a saving in the size and weight of the output transformer winding otherwise required. Another advantage of the direct voltage feedback connection is that it avoids the phase shift problems inherent in driving the voltage feedback winding of the saturable transformer with the additional secondary winding of the output transformer. It would be desirable to achieve a further saving in the total size and weight of the feedback transformer, while at the same time maintaining both current feedback and voltage feedback for easy starting into a full load as well as into a light or inductive load.

OBJECTS AND SUMMARY OF THE INVENTION

An object of this invention is to provide an improved oscillator of the push-pull amplifier type having both current and voltage feedback.

Another object is to improve the frequency stability of an oscillator of the push-pull amplifier type under a wide range of load.

Still another object is to improve the efficiency of an oscillator of the push-pull amplifier type under a wide range of load.

These and other objects of the invention are achieved by two transistors of the same conductivity type connected between opposite ends of a center-tapped primary winding of the output transformer. Ends of the center-tapped secondary winding on the saturable transformer are DC coupled to the base electrodes of the transistors. The center tap of that transformer is connected to circuit ground through a semiconductor diode polled for forward conduction of base current through the transistors. The center tap of the primary winding in the output transformer is connected to a source of DC voltage. This arrangement provides a current-feedback oscillator with improved switching from one transistor to another owing to the diode in the base circuit of each transistor. A capacitor connected in parallel with that diode stabilizes the operating function of that diode.

Improved voltage feedback is provided through a third primary winding on the saturable transformer connected in series with a feedback resistor between the center tap of the primary winding of the output transformer and the collector of one of the two transistors. A capacitor connected in parallel with that feedback resistor provides instantaneous voltage for demand drive current when the oscillator switches conduction from one transistor to another, thereby turning the other transistor on more quickly to maintain frequency of operation more stable.

The novel features that are considered characteristic of this invention are set forth with particularity in the appended claims. The invention will best be understood from the following description when read in conjunction with the accompanying drawings.

BRIEF DESCRIPTION OF THE DRAWINGS

The sole FIGURE shows a circuit diagram of a preferred embodiment of the present invention.

DESCRIPTION OF THE PREFERRED EMBODIMENTS

Referring now to the sole figure, an oscillator comprising two transistors $Q_1$ and $Q_2$ is coupled to a load 10 through an output transformer $T_1$ having a center tapped primary winding with the center tap connected to a source of +12 volts DC. The upper and lower halves of the primary winding are connected to the collectors of the transistors $Q_1$ and $Q_2$ through primary windings $P_1$ and $P_2$, respectively, of a saturable transformer $T_2$. The emitters of the transistors are connected to circuit ground and through a diode $D_1$ to the base electrodes of the transistors $Q_1$ and $Q_2$ through upper and lower halves of a center tapped secondary winding of the saturable transformer $T_2$. The ends of that secondary winding are connected to the base electrodes of the transistors $Q_1$ and $Q_2$ through current limiting resistors 11 and 12. A resistor 13 connects the source of +12 volts DC to the center tap of the secondary winding of the transformer $T_2$.

The circuit configuration thus far described constitutes a push-pull amplifier consisting of transistors $Q_1$ and $Q_2$ with positive current feedback through the saturable transformer. Once power is applied, the base emitter junctions of the transistors are forward biased through the resistor 13 and the current limiting resistors 11 and 12. Both transistors will start to conduct but since in practice the circuit will not be perfectly balanced, one of the transistors will conduct more heavily than the other. Assuming the transistor $Q_2$ conducts more heavily, its collector current through the primary winding $P_2$ will induce positive current feedback in the base of the transistor $Q_2$ and negative current feedback in the base of the transistor $Q_1$, thereby turning the transistor $Q_2$ fully on and turning off the transistor $Q_1$.

The level of conduction achieved by the transistor $Q_2$ will depend upon the level of collector current through the primary winding $P_1$. For a light or inductive load, that level of current will be relatively low, but for a full or capacitive load, that current will be high. Thus the base current of the transistor $Q_2$ will be proportional to load current to set the level of conduction of the transistor $Q_2$. Once the feedback current induced in the secondary winding of the saturable transformer $T_2$ subsides, the transistor $Q_2$ is cutoff, and stored energy in the saturable transformer will turn the transistor $Q_1$ on. The diode $D_1$ will remain forward biased as the transistor $Q_2$ is turned off and the transistor $Q_1$ is turned on. The voltage drop across the diode $D_1$ will aid in turning the transistor $Q_2$ off more quickly. To assure that the center tap of the secondary winding is maintained at a negative potential with reference to circuit ground by the amount of the voltage drop across the diode $D_1$, a capacitor 15 is connected in parallel with that diode to maintain that negative potential more stable while one transistor is turned off and the other turned on.

Once the oscillator is started through the resistor 13, oscillation will continue at a frequency which is almost independent of the +12 volt DC supplied to the center tap of the output transformer $T_1$ with an efficiency which remains substantially constant because base current is at all times proportional to the load. When connection to the load is open, the load current in the primary winding $P_1$ and $P_2$ will no longer induce sufficient base current in the transistors $Q_1$ and $Q_2$ to sustain oscillation. In that shut down condition one of the transistors will conduct at a very low standby level established by the base current through the resistor 13. As soon as a load is restored to the secondary winding of the transformer $T_1$, both transistors will tend to conduct more heavily but again, as in starting oscillation initially, one transistor will conduct more heavily than the other, thereby turning the other off to reestablish oscillation.

The ease with which the oscillator is started, or restarted, will depend upon the level of the load current. For a light or inductive load, starting is difficult. To expedite starting the oscillator with a light or inductive load, a positive voltage feedback is provided through a third primary winding $P_3$ on the saturable transformer $T_2$.

In the past, the voltage feedback winding $P_3$ has been connected to a separate secondary winding of the transformer $T_1$ or to the collectors of the transistors $Q_1$ and $Q_2$. A separate secondary winding on the output transformer $T_1$ is not desirable because of its additional weight and space. The alternative of connecting the voltage feedback winding across the collectors of the transistors is also not desirable because with the collectors connected to the ends of the primary winding of the transformer $T_1$ through the primary windings $P_1$ and $P_2$ of the saturable transformer $T_2$, the voltage across the third feedback winding will reach peaks of +24 volts, thereby requiring twice as many turns as required if the voltage feedback winding is connected between the source of +12 volts DC and the collector of one of the transistors. Thus, in accordance with an important feature of the present invention, the voltage feedback winding $P_3$ is connected between the source of +12 volts DC and the collector of the transistor $Q_2$ through a feedback resistor 16 which limits through the primary winding $P_3$.

The number of turns required for a given frequency is given by the following equation:

$$N = 10^8 V/4.0\, A_c B_m\, (F)$$

where: $V$ is the peak voltage across the primary winding $P_3$, $A_c$ is the cross-sectional area of the core, $B_m$ is the maximum magnetic flux density of the core and $F$ is the frequency. Thus, for a given frequency $F$, the number of turns required is directly proportional to the voltage across the primary winding $P_3$. Therefore, reducing the voltage $V$ to half that between the collectors of the transistors $Q_1$ and $Q_2$ will reduce the space and weight of the primary winding $P_3$ proportionally.

Reducing the number of turns in the primary winding $P_3$ has an additional advantage. Since that primary winding will have stray capacitance between turns, reducing the number of turns also reduces the stray capacitance so that demand drive current is provided through the primary winding $P_3$ more quickly. To provide a more nearly instantaneous increase of the positive feedback voltage, the demand drive current is more quickly increased by providing a capacitor 17 in parallel with the feedback resistor 16. When one transistor turns off, and the other turns on, a surge of current is instantaneously provided through the capacitor 17 to charge the stray capacitance of the primary winding $P_3$ more quickly. Thus, while the positive voltage feedback is increasing, the capacitor 17 provides a short circuit bypass to the primary winding $P_3$. Once the capacitor 17 and the stray capacitance of the primary winding $P_3$ have been charged, current is maintained through the limiting resistor 16.

The voltage feedback current in the primary winding $P_3$ induces positive feedback current in the base of one of the transistors while it induces negative feedback current in the base of the other transistor. Since the voltage feedback current in the primary winding $P_3$ is not dependent upon the load, voltage feedback will start the oscillator easily with a light or inductive load. However, if a malfunction in the load should short circuit the output, the voltage feedback circuit will become ineffective. Therefore, when the oscillator is designed with current feedback primary windings $P_1$ and $P_2$ with insufficient turns to sustain oscillation without voltage feedback, the oscillator will shut down when the output is shorted.

The current limiting resistors 11 and 12 are not necessary for the present invention, but in practice are desirable and useful in designing the circuit so that oscillation will not be sustained without voltage feedback, i.e., when the output is shortened. In the standby condition, when both transistors may be conducting, the resistors 11 and 12 are effective in limiting current, as noted herein before, thereby conserving power. Standby current through the primary winding $P_3$ is similarly limited by the resistor 16. Once any short of the output has been removed and a load has been connected to the transformer $T_1$, voltage feedback is quickly restored through the capacitor 17 to start the oscillator, even with a light or inductive load. If the load is full, or is capacitive, the current feedback may be relied upon to start the oscillator.

For an inductive load the voltage across a transistor may back bias it sufficiently to damage it. Accordingly, to protect the transistors $Q_1$ and $Q_2$, diodes $D_2$ and $D_3$ are connected between the collectors and circuit ground as shown. When the oscillator is used to provide high voltage dc from a low voltage dc source, the oscillator inverts the low-voltage direct current to alternating current which is transformed to the desired voltage level by the transformer $T_1$. The load 10 then consists of a rectifier and filter, such as the full-wave rectifier comprising diodes $D_4$ and $D_5$ and a filter comprising a capacitor 18. The ultimate load connected to the filter is represented by a resistor 19. If dc power is to be supplied to different loads at various levels, additional secondary winding may be provided on the transformer $T_1$ to drive separate rectifiers and filters for the different loads.

In a particular implementation, the transformer $T_2$ was selected to have high mutual inductance with a core of square-loop Permalloy having a cross-sectional area $A_c$ equal to 0.013 $cm^2$ and a maximum flux density $B_m$ equal to 7.5 K gauss. The equation given hereinbefore was then used to determine the number of turns for the primary winding $P_3$ with the frequency $F$ selected to be about 5 KHz and the voltage across the winding $P_3$ about 6 volts. That number was 320. The number of turns for each of the primary windings $P_1$ and $P_2$ was then similarly established at eight. Finally, the center tapped secondary winding was selected to have 80 turns on each side of the center tap for a base-emitter switching voltage of about 1.5 volts.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. An oscillator of the push-pull amplifier type comprising first and second transistors each having a base, an emitter, and a collector, means connecting said emitters of said transistors to circuit ground, an output transformer having a center tapped primary winding with first and second terminals at extreme ends thereof, means for connecting said center tap of said output transformer to a source of DC voltage, a saturable transformer having a center tapped secondary winding with first and second terminals at extreme ends thereof, and first, second and third primary windings, said first and second primary windings having an equal number of turns, separate means for connecting the bases of said first and second transistors to respective ones of said first and second end terminals of said secondary winding of said saturable transformer, means for connecting said first primary winding of said saturable transformer between said first terminal of said primary winding of said output transformer and said collector of said first transistor with the polarity of said first primary winding selected to provide positive feedback current in the base of said first transistor when said first transistor conducts, means for connecting said second primary winding of said saturable transformer between said second terminal of said primary winding of said output transformer to said collector of said second transistor with the polarity of said second primary selected to provide positive feedback current in the base of said second transistor when said second transistor conducts, means for connecting said center tap of said secondary winding of said saturable transformer to circuit ground, and means for connecting said third primary of said saturable transformer between said source of dc voltage and said collector of one of said transistors.

2. An oscillator as defined in claim 1 wherein said means for connecting said third primary winding between said source of dc voltage and said

3. An oscillator as defined in claim 2 including a capacitor connected in parallel with said current limiting resistor.

4. An oscillator as defined in claim 3 wherein said separate means for connecting said first and second terminals of said secondary winding of said saturable transformer to said bases of said first and second transistors each comprises a current limiting resistor.

5. An oscillator of the push-pull amplifier type comprising first and second transistors each having a base, an emitter and a collector, means for connecting said emitters of said transistors to circuit ground, an output transformer having a center tapped primary winding with first and second terminals at extreme ends thereof, means for connecting said center tap of said output transformer to a source of DC voltage, a saturable transformer having a center tapped secondary winding with first and second terminals at extremes ends thereof, and first and second primary windings, said first and second primary windings have an equal number of turns, separate means for connecting the bases of said first and second transistors to respective ones of said first and second end terminals of said secondary winding of said saturable transformer, means for connecting said first primary winding of said saturable transformer between said first terminal of said primary winding of said output transformer and said collector of said first transistor with the polarity of said first primary winding selected to provide positive feedback current in the base of said first transistor when said first transistor conducts, means for connecting said second primary of said saturable transformer winding between said second terminal of said primary winding of said output transformer to said collector of said second transistor with the polarity of said second primary selected to provide positive feedback current in the base of said second transistor when said second transistor conducts, a resistor connecting said center tap of said secondary winding of said saturable transformer to said source of DC voltage, a diode connecting said center tap of said secondary winding of said saturable transformer to said circuit ground, said diode being polled for forward conduction of base current in said transistors as they conduct alternately, a capacitor connected in parallel with said diode, and a third primary winding on said saturable transformer.

6. An oscillator as defined in claim 5 wherein said means for connecting said third primary winding between said source of DC voltage and said collector of said one of said transistors comprises a current limiting resistor.

7. An oscillator as defined in claim 6 including a capacitor connected in parallel with said current limiting resistor.

8. An oscillator as defined in claim 7 wherein each of said means for connecting first and second terminals of said secondary winding of said saturable transformer to said base of each of said first and second transistors comprises a current limiting resistor.

* * * * *